Patented June 12, 1951

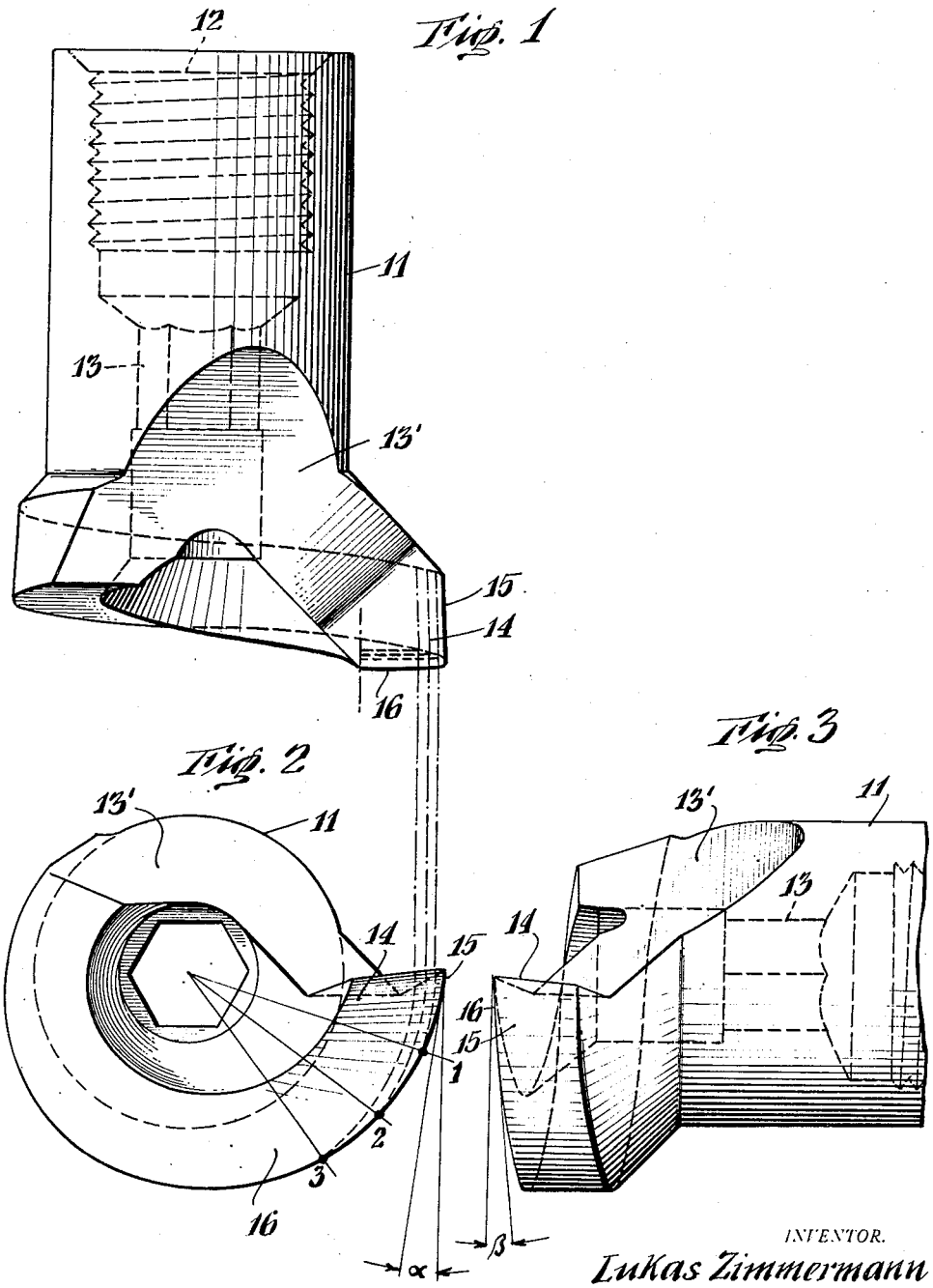

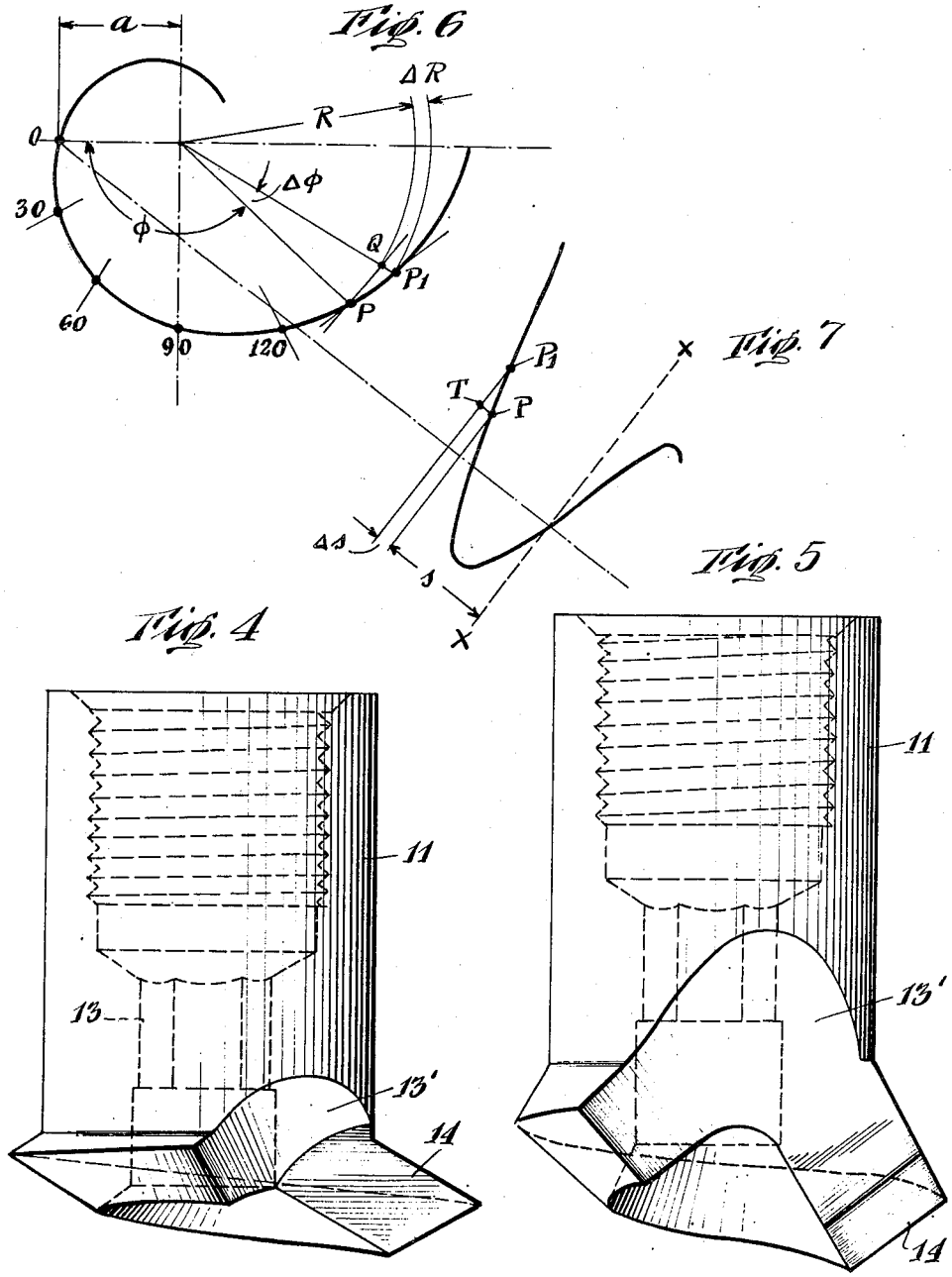

2,556,745

UNITED STATES PATENT OFFICE 2,556,745

CUTTING TOOL

Lukas Zimmermann, Birmingham, Mich.

Application October 8, 1946, Serial No. 701,949

4 Claims. (Cl. 29—95)

This invention relates to single point cutting tools of the type, shown for example, in the patent to Jfanger, 1,408,205, February 28, 1922, which comprises generally a supporting shank having a cutting tooth so formed as to operate in a manner of a backed off cutter. Sharpening of the tooth is accomplished by grinding the tooth face.

Because of the manner in which such tools have heretofore been made, the clearance angle of the tooth has been found to increase as the face is ground away in re-sharpening, with the result that such angles quickly reach a point rendering the tool useless long before the material of the cutting tooth is entirely used up.

An object of this invention is to provide an improved cutting tool having a tooth so formed and arranged as to permit using substantially the entire material of the tooth for cutting purposes.

A further object of this invention is to provide a cutting tool of the type described having a tooth so shaped as to permit repeated grinding of the tooth face without changing the clearance characteristics of the tooth.

These and other objects which will be apparent are accomplished by the invention hereinafter described and illustrated in the accompanying drawings in which Fig. 1 is a plan view of a boring tool having a cutting tooth formed in accordance with this invention. In this view, the tooth has a square face for boring holes with square bottoms or with square shoulders. Fig. 2 is an end view of the tool shown in Fig. 1. Fig. 3 is a side elevation thereof. Fig. 4 is a view similar to Fig. 1, showing a cutter having a tooth formed in accordance with this invention for cutting internal threads. Fig. 5 is a similar view showing the invention applied to a still different type of cutting tool having a tooth suitable for the general boring of holes, for example, in a lathe or in a boring mill. Figs. 6 and 7 are diagrams showing the mathematical development of a cutting tooth in accordance with the present invention.

This invention is illustrated in connection with a cutting tool having a head 11, and a bore 12 threaded at one end for attachment to a supporting shank and having a hexagon shape 13 adjacent the other end of the head to facilitate use of a suitable wrench for mounting or removing the head from a supporting shank. The bore is also available for passing coolant through the tool during a cutting operation. The head is formed with a notch 13'.

As shown in Figs. 1, 2 and 3, a cutting tooth 14 is formed at one side of the notch 13' and extends around the head 11 on a spiral curve so that when the axis of the tool is placed at the same height as the center line of the work, there will be a positive clearance angle between the work and the side face of the tooth. In resharpening the tooth is ground at the top face only in a manner similar to that employed in sharpening a conventional circular form tool. This method of re-sharpening is simple and maintains the cross-sectional form of the tooth. After each re-grinding, it is necessary to rotate the tool to bring the new cutting edge up to the horizontal center line of the work. Obviously, the spiral shape maintains a clearance angle without grinding the surfaces of the tooth. As shown in Fig. 1, the side face 15 and the end face 16 of the tooth are formed on combination spiral-helical curves which advance along the axis of the tool in such a manner as to provide for constant side and end clearance at the tooth face regardless of the diameter to which the tooth may be reduced by repeated grinding for sharpening purposes.

A cutting tooth formed in accordance with the present invention might be described as a tooth formed on a three-dimensional curve which approaches the axis of the tool, in such a way that the curve at all points forms a substantially constant angle with the radius vector, while advancing in the direction of the axis so as to provide for a substantially constant end clearance angle, along the entire cutting edge, irrespective of the diameter of such edge. To accomplish this result, referring to Figs. 1, 2 and 3, the outer edge of the tooth when viewed from the end of the tool, is a spiral conforming to the equation:

$$R = a e^{m\phi}$$

where

R = radius vector or distance of a given point of the curve from the margin, which is the axis of the head.

$\phi$ = angle (in radians) between the radius vector and a chosen zero line.

$a$ = length of the zero line measured from the origin to its intersection with the curve.

$e = 2.71828\ldots$ or basis of natural logarithms.

$m$ = constant.

Fig. 6 shows the derivation of the angle formed between a tangent to the spiral at a given point P and a tangent to a circular arc through the same point with the origin of the curve as its center. Applied to the tool in Fig. 2, this angle is the side clearance angle $a$. Referring to Fig. 6, the point P is determined by the radius vector R and the angle $\phi$. Likewise, point $P_1$ being another point of the same curve at some small distance from P is determined by radius vector $R+\Delta R$ and angle $\phi+\Delta\phi$. By drawing chord $PP_1$ of the curve and the chord PQ of the circular arc, the triangle $QPP_1$ is formed. Since this triangle is assumed to be small it follows that $$\text{Tan } QPP_1 = \frac{\Delta R}{R.\Delta\phi}$$

The limit of this relation is reached when $$\Delta\phi \to d\phi = 0$$

and chord $PP_1$ becomes the tangent to the spiral at point P, and chord PQ becomes the tangent to the circular arc at the same point, and it will then be $$\text{Tan}\alpha = \frac{dR}{R.d\phi}$$

or, substituting from the general equation for the spiral:

$$R = a.e^{m\phi}$$

and, by differentiation $$\frac{dR}{d\phi} = a.m.e^{m.\phi}$$

we get $$\text{Tan } \alpha = \frac{a.m.e^{m\phi}}{m.\phi}$$

or $$\text{Tan } \alpha = m$$

This means that the side clearance angle is constant for all points of the curve and the general equation of the spiral can be used for calculating the values of R, for as many values of $\phi$ as needed to draw the curve.

Referring to Fig. 7 which shows the determination of the clearance angle for the front face of the tooth by an equation giving the distance of any given point on the face, in a direction parallel to the tool axis, from a given reference plane perpendicular to the tool axis such, for example, as the plane $x$—$x$ in Fig. 7, if we denote the distance of point P from this reference plane as $s$ and the distance of point $P_1$ as $s+\Delta s$ then $$\text{Tan } \sphericalangle PP_1T = \frac{\Delta s}{R.\Delta\phi}$$

The limit of this relation for $\Delta s \to ds = 0$ is $$\text{Tan } \beta = \frac{ds}{R.d\phi}$$

or $$ds = R \tan \beta d\phi$$

or, substituting $R = a.e^{m\phi}$ it becomes $$ds = \tan \beta.a.e^{m\phi}.d\phi$$

and, by integration $$\int ds = \tan \beta a.\int e^{m\phi}.d\phi$$

or $$s = \frac{\tan \beta}{m}.a.e^{m.\phi} + C$$

or $$s = \frac{\tan \beta}{m}.R + C$$

The value of C is determined from the fact that for $\phi=0$, $R=a$ and $s=0$. Substituting these values in the equation for $s$ gives $$C = -a\frac{\tan \beta}{m}$$

and by substituting this in the equation for $s$ $$s = \frac{\tan \beta}{m}.R - a.\frac{\tan \beta}{m}$$

or $$s = \frac{\tan \beta}{m}.(R-a)$$

This equation gives a convenient means of calculating the values of $s$ from the values of R as formerly arrived at by means of the equation for the spiral curve of Fig. 6.

It will be apparent that a tool designed in this manner will have a cutting tooth so formed as to provide constant clearance angles along its entire edge and that such angles will not be changed by sharpening. The exact character of the spiral tooth is indicated in Figs. 1 and 2 in which a number of sections through the tooth on longitudinal planes are indicated by the lines 1, 2 and 3 in the end view of Fig. 2, spaced at equal angular increments $\Delta\phi$. These sections are rotated about the axis of the tool until they fall into the horizontal plane of the tool axis and are shown superimposed in dotted lines on the tooth in Fig. 1 by projection.

It should be noted from the equation for $s$ that the end clearance angle $\beta$ can be made of any desired value independent of the side clearance angle $a$. Thus, it is possible to employ a larger clearance angle in the direction of feed than at right angles thereto, if and when this is desired. For example, a tool of the shape shown in Figs. 1, 2 and 3, if used exclusively for boring would have a small value for $a$ and a larger value for $\beta$ while in a tool used exclusively for facing this condition would be reversed. For a tool intended for both boring and facing, both angles would probably be equal. In this particular case the value $$\frac{\tan \beta}{m} = 1$$

and, substituting this it would become $s = R-a$.

Although the present invention has been described in connection with certain specific embodiments thereof, it will be apparent that various changes can be made therein without departing from the spirit of the invention as defined in the appended claims.

I claim:

1. A cutting tool having a notched head which has a side face and an end face intersecting to form a cutting tooth extending around the axis of said head on a combination spiral-helical curve which approaches the axis of said head in such a manner that said side face forms at all points a substantially constant angle with the radius vector of said curve and said end face forms at substantially all points along said edge a constant angle with a plane perpendicular to said axis.

2. A cutting tool having a notched head which has a side face and an end face forming a cutting tooth extending around the axis of said head, said side and end faces intersecting on a combination spiral-helical curve which approaches the axis of said head in such a manner that said curve forms at all points a substantially constant angle with its radius vector and also forms at all points along said curve a substantially constant angle with a plane perpendicular to said axis.

3. A cutting tool having a notched head forming a cutting tooth extending substantially entirely around the axis of said head on a spiral curve which approaches the axis of said head in such a manner that said spiral curve forms at all points a substantially constant angle with its radius vector.

4. A thread cutting tool having a notched head comprising a V-shaped thread cutting tooth projecting outwardly from said head, said tooth being formed by two intersecting tooth faces, the said faces intersecting on a combination spiral-helical curve which approaches the axis of said head in such a manner that said curve forms at all points a substantially constant angle with its radius vector and also forms at all points along said curve a substantially constant angle with a plane perpendicular to said axis.

LUKAS ZIMMERMANN.

REFERENCES CITED

The following references are of record in the file of this patent:

UNITED STATES PATENTS

| Number | Name | Date |
| --- | --- | --- |
| 382,724 | Peterson | May 15, 1888 |
| 1,599,611 | Dover | Sept. 14, 1926 |

FOREIGN PATENTS

| Number | Country | Date |
| --- | --- | --- |
| 144,065 | Switzerland | Mar. 2, 1931 |
| 256,153 | Great Britain | Aug. 5, 1926 |
| 751,451 | France | Sept. 4, 1933 |